United States Patent
Yemini

[19]

[11] Patent Number: 6,120,103
[45] Date of Patent: Sep. 19, 2000

[54] TWO-WAY WHEEL ASSEMBLY

[75] Inventor: Zvi Yemini, Tel Aviv, Israel

[73] Assignee: Zag Ltd., Rosh Ha'Ayin, Israel

[21] Appl. No.: 08/943,194

[22] Filed: Oct. 3, 1997

[51] Int. Cl.[7] .................................................. B60B 37/00
[52] U.S. Cl. ........................................... 301/5.1; 280/79.1
[58] Field of Search ............................... 16/30, 29, 31 R, 16/31 A, 43; 280/79.1, 79.2; 301/1, 5.1, 111; 220/908

[56] References Cited

U.S. PATENT DOCUMENTS

| | | | |
|---|---|---|---|
| 2,152,217 | 3/1939 | Shaw | 280/79.2 |
| 2,447,028 | 8/1948 | Riddick | 280/79.2 |
| 3,942,814 | 3/1976 | Buhler | 280/79.1 |
| 4,262,780 | 4/1981 | Samuelian | 16/29 |
| 5,136,751 | 8/1992 | Coyne et al. | 16/30 |
| 5,580,074 | 12/1996 | Moreno | 280/79.1 |

*Primary Examiner*—D. Glenn Dayoan
*Assistant Examiner*—Long Bao Nguyen
*Attorney, Agent, or Firm*—Pillsbury Madison & Sutro LLP

[57] ABSTRACT

A wheel assembly attached to, or integrally formed with, the underside of an object for allowing the object to roll in one of at least two rolling directions includes a fixture and a wheel. The fixture has a first pair of spaced-apart axle mountings defining between them a first axial direction perpendicular to a first rolling direction, and a second pair of spaced-apart axle mountings defining between them a second axial direction perpendicular to a second rolling direction. The wheel has an axial projection extending from each side. The axle mountings and the axial projections are configured such that the wheel can be located with the axial projections retained by the first pair of axle mountings for allowing the object to roll in the first rolling direction, and alternatively, with the axial projections retained by the second pair of axle mountings for allowing the object to roll in the second rolling direction.

12 Claims, 3 Drawing Sheets

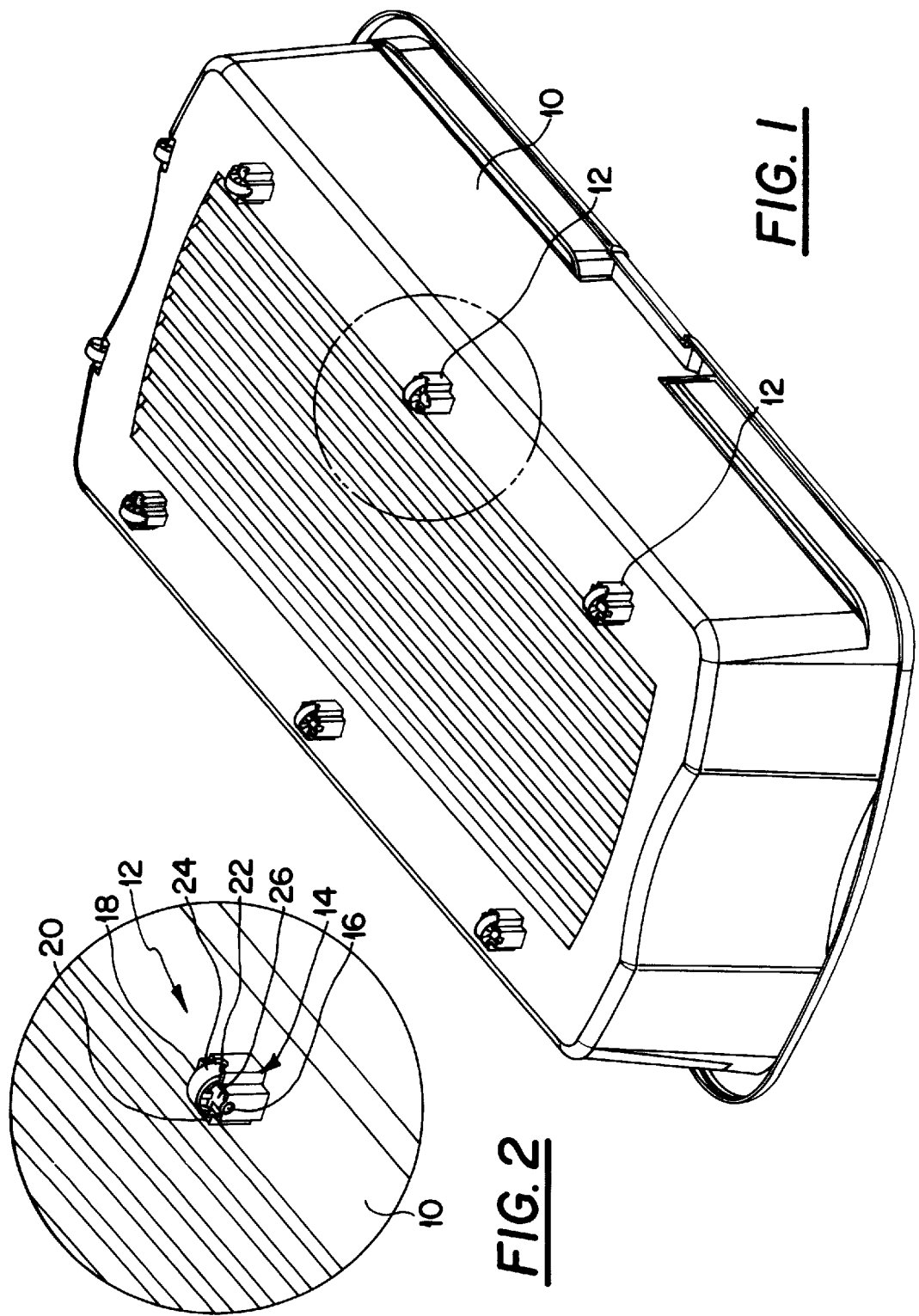

TWO-WAY WHEEL ASSEMBLY

FIELD AND BACKGROUND OF THE INVENTION

The present invention relates to wheel assemblies and, in particular, it concerns a wheel assembly for allowing a container to roll in one of at least two rolling directions.

It is known to provide integral or attached wheel assemblies to facilitate moving heavy or cumbersome containers. A particularly simple and cost effective example is a snap-fit wheel assembly, typically made from plastic, in which a wheel snaps into a socket.

A disadvantage of existing snap-fit wheel assemblies is that they are limited to a single fixed wheel position corresponding to only one rolling direction. As a result, a design choice of wheel orientation must be made before manufacture, limiting the usefulness of the resulting product.

There is therefore a need for a simple snap-fit wheel assembly which allows a container to roll in one of at least two non-parallel rolling directions.

SUMMARY OF THE INVENTION

The present invention is a snap-fit wheel assembly which can be assembled selectively to allow a container to roll in any one of at least two nonparallel parallel rolling directions.

According to the teachings of the present invention there is provided, a wheel assembly attached to, or integrally formed with, the underside of an object for allowing the object to roll in one of at least two rolling directions, the wheel assembly comprising: (a) a fixture having: (i) a first pair of spaced-apart axle mountings defining between them a first axial direction perpendicular to a first rolling direction, and (ii) a second pair of spaced-apart axle mountings defining between them a second axial direction perpendicular to a second rolling direction; and (b) a wheel having an axial projection extending from each side, wherein the axle mountings and the axial projections are configured such that the wheel can be located with the axial projections retained by the first pair of axle mountings for allowing the object to roll in the first rolling direction, and alternatively, with the axial projections retained by the second pair of axle mountings for allowing the object to roll in the second rolling direction.

According to a further feature of the present invention, the first and the second axial directions are substantially mutually perpendicular.

According to a further feature of the present invention, the wheel has a diameter, the first and second pair of axle mountings being spaced apart by more than the diameter.

According to a further feature of the present invention, the fixture includes a housing substantially enclosing the wheel.

According to a further feature of the present invention, the axle mountings are integrally formed with the housing.

According to a further feature of the present invention, the housing is formed with two slots elongated parallel to the first and second axial directions, respectively.

BRIEF DESCRIPTION OF THE DRAWINGS

The invention is herein described, by way of example only, with reference to the accompanying drawings, wherein:

FIG. 1 is an isometric view of the underside of a container having with a number of two-way wheel assemblies, constructed and operative according to the teachings of the present invention;

FIG. 2 is an enlarged isometric view of one of the wheel assemblies of FIG. 1;

DESCRIPTION OF THE PREFERRED EMBODIMENTS

Figure 3:
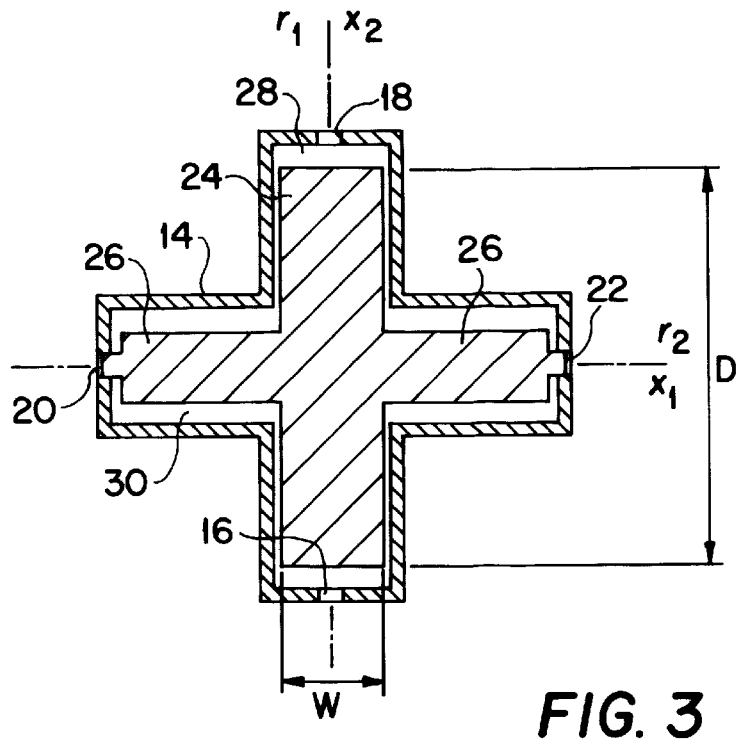
FIG. 3 is a horizontal cross-sectional view through the wheel assembly of FIG. 2.

The present invention is a snap-fit wheel assembly which can be assembled selectively to allow a container to roll in any one of at least two non-parallel rolling directions.

The principles and operation of wheel assemblies according to the present invention may be better understood with reference to the drawings and the accompanying description.

Referring now to the drawings, FIG. 1 shows a container 10 provided with a number of two-way wheel assemblies 12, constructed and operative according to the teachings of the present invention. The structure of each wheel assembly 12 is best seen in FIG. 2.

Wheel assembly 12 which is attached to, or integrally formed with, the underside of container 10 is configured to allow the container to roll in one of at least two rolling directions. Generally speaking, wheel assembly 12 includes a fixture 14 having a first pair of spaced-apart axle mountings 16 and 18 which define between them a first axial direction xi, perpendicular to a first rolling direction $r_1$, and a second pair of spaced-apart axle mountings 20 and 22 which define between them a second axial direction $x_2$, perpendicular to a second rolling direction $r_2$.

Wheel assembly 12 also includes a wheel 24 which has an axial projection 26 extending from each side. Axle mountings 16, 18, 20 and 22 and axial projections 26 are configured such that wheel 24 can be located in at least two different positions: in a first position, axial projections 26 are retained by the first pair of axle mountings 16 and 18, thereby allowing the container to roll in first rolling direction $r_1$; alternatively, in a second position, axial projections 26 are retained by the second pair of axle mountings 20 and 22, thereby allowing the container to roll in second rolling direction $r_2$.

Preferably, although not necessarily, first and second axial directions $x_1$ and $X_2$ of the "two-way" embodiment are substantially mutually perpendicular. As a result, wheel assembly 12 provides two mutually perpendicular rolling directions such as, for example, parallel to a longer side and a shorter side of container 10.

It should be noted that the term "container" is used herein in the description and claims to refer to any type of container. Examples include, but are not limited to, molded plastic boxes, bins, trays or carts of any size and soft or hard packing cases. Furthermore, while being described with reference to a container 10, the wheel assembly of the present invention is not limited to applications commonly referred to as containers, and should be considered to encompass a range of applications including, but not limited to, items of furniture.

Wheel assembly 12 is described as a "two-way" wheel assembly in accordance with the preferred embodiment illustrated here. However, it should be appreciated that that the principles of the present invention may readily be employed to provide a three- or four-way assembly, i.e., with three or four distinct angular positions available. Thus, wheel assembly 12 may be described more precisely as a "multi-way" wheel assembly.

It should be noted that the term "axle mounting" is used herein in the description and claims to refer to any structure which allows mounting of an axle rotatably about its axis. Examples include, but are not limited to, sockets or clips for retaining part of projections 26, and inwardly-projecting pins or spindles for engaging a recess in projections 26. Preferably, the axle mountings and corresponding projections 26 are configured to provide a convenient snap-fit assembly.

Turning now to the features of wheel assembly 12 in more detail, clearly the configuration of each pair of axle mountings, for example, 16 and 18, must not obstruct wheel 24 when attached to the other pair, 20 and 22. This requirement may be satisfied in a number of ways.

In the preferred example of wheel assembly 12, best seen in FIG. 3, clearance between wheel 24 and the axle clips is ensured by separating the axle clips in the corresponding axial direction by more than the diameter D of wheel 24. In this case, projections 26 are sufficiently long to engage a pair of axle clips, as shown.

In this preferred embodiment, axle mountings 16, 18, 20 and 22 are preferably formed as an integral part of fixture 14, configured to form a housing substantially enclosing wheel 24.

In one particularly advantageous implementation, housing 14 is formed with walls corresponding to two intersecting slots 28 and 30, elongated parallel to the first and second axial directions $x_1$ and $x_2$, respectively. Slots 28 and 30 preferably have an internal width only slightly larger than width W of wheel 24 so that they function as a guard for removing dirt and other objects which might stick to the wheels during use.

The axle mountings, along with the rest of wheel assembly 12, are typically made from plastics or other polymer materials by injection molding. Optionally, housing 14 may be integrally formed as part of container 10.

Figure 4:
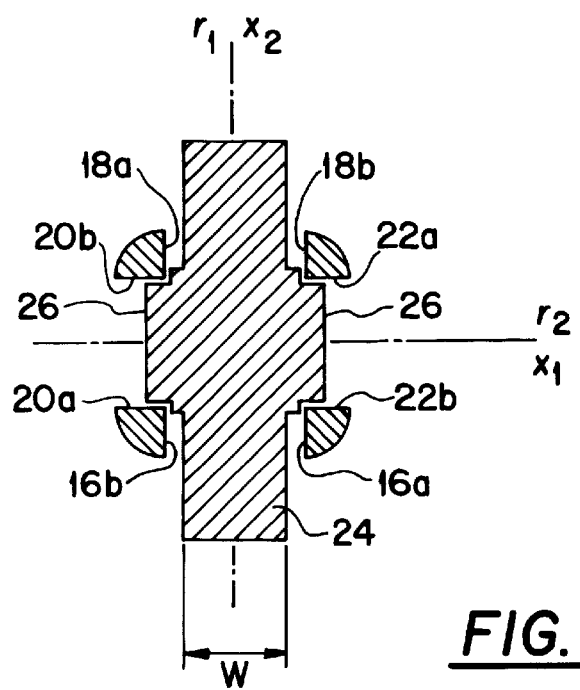
FIG. 4 is a horizontal cross-sectional view through an alternative embodiment of a wheel assembly, constructed and operative according to the teachings of the present invention.

In an alternative embodiment of wheel assembly 12 illustrated in FIG. 4, each axle mounting is formed as two spaced apart surfaces, denoted by suffixes a and b after the corresponding numeral for each axle mounting, separated by more than the width W of wheel 24 so as to allow the wheel to turn between them. In this case, projections 26 are sized and shaped to engage between the spaced apart surfaces of the axle clips.

The use of the present invention will now be described with reference to FIGS. 5 and 6. Container 10 is preferably supplied to an end user with wheel fixtures 14 and the appropriate number of wheels 24, either attached in an initial configuration or provided detached. The user then selects the desired configuration and snap-fits wheels 24 into fixtures 14 in the appropriate orientation.

Figure 5:
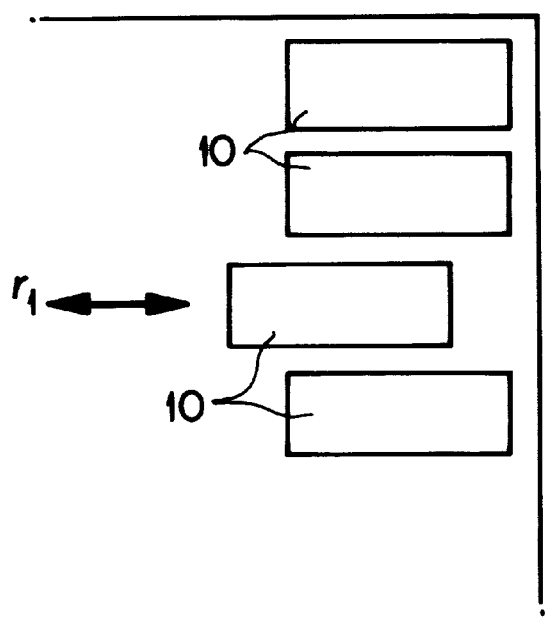
FIG. 5 is a schematic plan view illustrating the use of a number of containers similar to that of FIG. 1 with the wheel assemblies in a first configuration.

FIG. 5 shows a first example in which an array of rectangular containers 10 are stored along a wall such that they are most conveniently accessed by sliding them in a direction $r_1$ parallel to their length.

Figure 6:
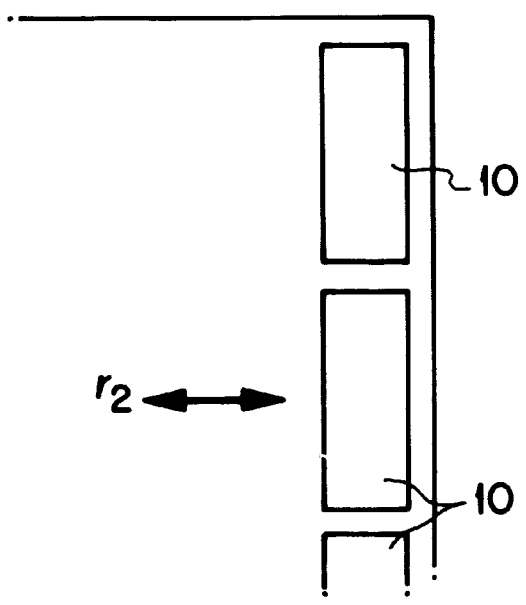
FIG. 6 is a schematic plan view illustrating the use of a number of containers similar to that of FIG. 1 with the wheel assemblies in a second configuration.

FIG. 6 shows a second example in which an array of rectangular containers 10 are stored along a wall such that they are most conveniently accessed by sliding them in a direction $r_2$ parallel to their width.

Thus, it will readily be appreciated that wheel assembly 12 provides greatly improved convenience and flexibility to the user compared with conventional fixed-direction snap-fit wheel assemblies.

It will be appreciated that the above descriptions are intended only to serve as examples, and that many other embodiments are possible within the spirit and the scope of the present invention.

What is claimed is:

1. A wheel assembly attached to the underside of an object for allowing the object to roll in one of at least two rolling directions, the wheel assembly comprising:
    (a) a fixture having:
        (i) a first pair of spaced-apart axle mountings defining between them a first axial direction perpendicular to a first rolling direction, and
        (ii) a second pair of spaced-apart axle mountings defining between them a second axial direction perpendicular to a second rolling direction; and
    (b) a wheel having an axial projection extending from each side, wherein said axle mountings and said axial projections are configured such that said wheel can be located with said axial projections retained by said first pair of axle mountings for allowing the object to roll in the first rolling direction, and alternatively, with said axial projections retained by said second pair of axle mountings for allowing the object to roll in the second rolling direction.

2. The wheel assembly of claim 1, wherein said first and said second axial directions are substantially mutually perpendicular.

3. The wheel assembly of claim 1, wherein said wheel has a diameter, said first and second pair of axle mountings being spaced apart by more than said diameter.

4. The wheel assembly of claim 1, wherein said fixture includes a housing substantially enclosing said wheel.

5. The wheel assembly of claim 4, wherein said axle mountings are integrally formed with said housing.

6. The wheel assembly of claim 4, wherein said housing is formed with two slots elongated parallel to said first and second axial directions, respectively.

7. A wheel assembly integrally formed with the underside of an object for allowing the object to roll in one of at least two rolling directions, the wheel assembly comprising:
    (a) a fixture having:
        (i) a first pair of spaced-apart axle mountings defining between them a first axial direction perpendicular to a first rolling direction, and
        (ii) a second pair of spaced-apart axle mountings defining between them a second axial direction perpendicular to a second rolling direction; and
    (b) a wheel having an axial projection extending from each side, wherein said axle mountings and said axial projections are configured such that said wheel can be located with said axial projections retained by said first pair of axle mountings for allowing the object to roll in the first rolling direction, and alternatively, with said axial projections retained by said second pair of axle mountings for allowing the object to roll in the second rolling direction.

8. The wheel assembly of claim 7, wherein said first and said second axial directions are substantially mutually perpendicular.

9. The wheel assembly of claim 7, wherein said wheel has a diameter, said first and second pair of axle mountings being spaced apart by more than said diameter.

10. The wheel assembly of claim 7, wherein said fixture includes a housing substantially enclosing said wheel.

11. The wheel assembly of claim 10, wherein said axle mountings are integrally formed with said housing.

12. The wheel assembly of claim 10, wherein said housing is formed with two slots elongated parallel to said first and second axial directions, respectively.

* * * * *